UNITED STATES PATENT OFFICE.

THOMAS JONES, OF CHICAGO, ILLINOIS.

PLASTER.

SPECIFICATION forming part of Letters Patent No. 451,560, dated May 5, 1891.

Application filed October 10, 1890. Serial No. 367,722. (No specimens.)

*To all whom it may concern:*

Be it known that I, THOMAS JONES, of Chicago, Illinois, have invented a certain new and useful Plaster, of which the following is a specification.

My plaster is extremely hard and successfully resists fire and clings with the utmost tenacity to wooden surfaces, whether of laths or grooved boarding, and is therefore specially adapted for covering walls or ceilings and protecting wood or other combustible material from the action of fire, as well as for general plastering purposes. As the plaster contains within itself the necessary hardening properties, it may be laid on and finished the same day on which it is applied, thus rendering unnecessary the delay incident to the drying of lime mortars. Another important advantage gained by the use of my plaster is that it does not set too quickly, but allows the workman ample time to put the work into proper condition without the use of any objectionable organic matter so commonly used as a "retarder" where common stucco is used as a plaster, and also dispenses with the use of hair where lime mortar is so used.

In carrying out my invention I proceed as follows: I take fine clay, kaolin preferred, and calcine it for about half an hour at a dull red heat. I then immerse the clay in a solution consisting of water, four or five parts, and sulphuric acid, one part, by weight, in which I allow it to remain for a considerable period of time, say, four or five weeks, after which I remove it to a dry place and expose it to the atmosphere for a further period of four or five weeks or longer, when I reduce it to a fine powder and set it aside for use when required.

Simultaneously with the preparation of the clay, as described above, I take granite (that containing potash, not soda, preferred) or other suitable rock, such as trachyte, feldspar, leucite, muscovite, mica, or micaceous schists, or any other rock containing the alkali above mentioned, and after breaking it into pieces of convenient size, say, from one pound to two pounds each in weight, I treat in all respects the same as the clay. I next take gypsum-rock, and after breaking into pieces of one or two pounds each, by weight, I calcine in a suitable kiln for half an hour at a low red heat, and then reduce to powder and add of the powdered granite and clay prepared as described above, ten per cent. each of the weight of the burnt gypsum and thoroughly incorporate the whole together. The plaster is then ready for use. When about to apply it, I mix it with an equal bulk of clean sharp sand, and add sufficient quantity of water to bring to a proper consistency. It may then be laid on in precisely the same manner as common mortar. When it has become sufficiently hard, I prepare the finish coat by mixing an equal bulk of plaster and lime putty together, and apply it in all respects in the same manner as ordinary hard finish.

I do not limit my invention to the precise proportions or treatment herein described, as these may be varied considerably without departing from the spirit of my invention or impairing the usefulness of the plaster—as, for example, I may omit the calcination of the clay or granite and simply immerse them in the solution for a sufficient length of time to insure the reduction of the alkaline earths or bases, or any metallic element which may be present in the clay or rock to the condition of sulphates, the calcination of the clay being mainly intended to destroy any foreign organic matter which it may contain, and in the case of the granite to cause it to crack and fall to pieces and so to expose it more effectually to the action of the acid.

Instead of comminuting the clay and granite separately, they may, after having been treated as above described, be ground together with the gypsum with equally good results, and in some cases more economically. The acid solution may also be heated in order to hasten the process. The over calcination of the gypsum destroys its quick-setting property.

I claim—

1. As a composition of matter, a plaster composed of clay, granite, sulphuric acid, and gypsum, in about the proportions stated.

2. The herein-described process for the production of plaster, consisting in mixing clay which has been steeped in sulphuric acid and calcined granite steeped in sulphuric acid and overcalcined gypsum.

THOMAS JONES.

Witnesses:
C. C. LINTHICUM,
FREDERICK C. GOODWIN.